HIRAM BECKWITH.
Improvement in Device for Tightening Loose Tires.
No. 121,039. Patented Nov. 21, 1871.
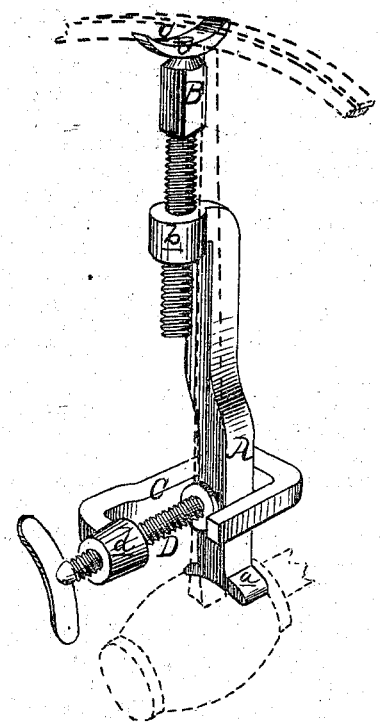
ATTEST:
Myron H. Church
H. F. Eberts.
INVENTOR:
Hiram Beckwith
per attorney
Wm. S. Sprague

UNITED STATES PATENT OFFICE.

HIRAM BECKWITH, OF GRASS LAKE, MICHIGAN.

IMPROVEMENT IN DEVICES FOR TIGHTENING LOOSE TIRES.

Specification forming part of Letters Patent No. 121,039, dated November 21, 1871.

*To all whom it may concern:*

Be it known that I, HIRAM BECKWITH, of Grass Lake, in the county of Jackson and State of Michigan, have invented a new and useful Improvement in a Device for Tightening Loose Tires; and I do declare that the following is a true and accurate description thereof, reference being had to the accompanying drawing and to the letters of reference marked thereon and being a part of this specification, in which the invention is shown in perspective, with a hub, spoke, and segment of felly in dotted outline.

The nature of this invention relates to a device for tightening loose tires on carriage-wheels without removal or heating; and it consists in a peculiar standard to be placed on the hub, provided with a clamp for securing it to a spoke and a screw for forcing out the felly from the tenon of the spoke, to enable a leather washer to be placed on the shoulder of the tenon, after which the pressure is relieved from the felly. The felly of the wheel being subjected to a similar treatment at each spoke, it follows that the entire wheel must be equally expanded against the tire at all parts of its circumference; or as many of the spokes thereof as may be necessary are so treated to accomplish the purpose.

In the drawing, A represents a metallic standard, provided with an arched foot, *a*, to rest upon the hub, just behind the spoke. The top of the standard is turned over forward, and threaded to form a nut, *b*, to receive a longitudinal screw, B, the top of which carries a swivel-bearer, *c*, which comes under the felly. The upper part of the screw is squared so that it may be turned by a wrench. C is a horizontal clamp forged on the lower part of the standard, its long arm being carried forward and turned in front of the spoke to form a nut, *d*, in which is threaded a clamp-screw, D. To take up the slack in a loose tire the standard is rested upon the hub, behind a spoke, as shown, and the clamp-screw is screwed in to force the spoke into close contact with the lower part of the standard, the upper part of which is so curved as to bring the elevating-screw to one side thereof. The bearer is now brought under the felly. Now, by turning the screw outward the felly will be raised off the shoulder of the tenon of the spoke sufficiently to allow a leather washer to be inserted between the felly and the shoulder of the spoke. When the pressure is relieved the felly will seat itself on this washer.

The clamp also prevents the spoke from being withdrawn from the hub in case that the felly-tenon should be a closer fit than the hub-tenon.

If the tire be very loose the operation should be repeated at every spoke; but if not, a sufficient number of washers should be inserted at opposite points in the wheel to expand the felly sufficiently against the tire to accomplish the purpose.

What I claim as my invention, and desire to secure by Letters Patent, is—

The combination of the standard A provided with the claw-foot *a*, the nut *b*, and the clamp G with the screw B provided with the swivel-bearing *c* and the screw D, all constructed, arranged, and operated substantially as described and shown.

HIRAM BECKWITH.

Witnesses:
HARRY S. SPRAGUE,
FREDERICK EBERTS. (31)